Sept. 22, 1931.  A. L. V. C. DEBRIE  1,824,709
APPARATUS FOR TAKING PHOTOGRAPHIC OR CINEMATOGRAPHIC PICTURES
Filed March 17, 1926    2 Sheets-Sheet 1

Inventor
A. L. V. C. Debrie
by Langner, Parry, Card & Langner
Atty's

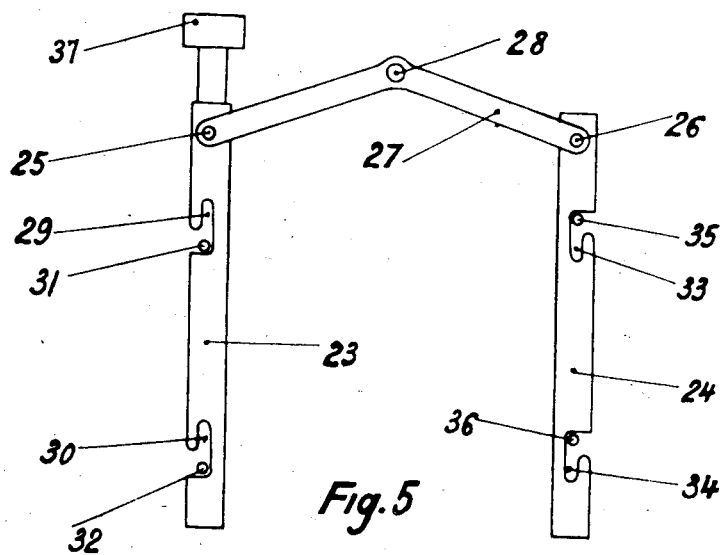
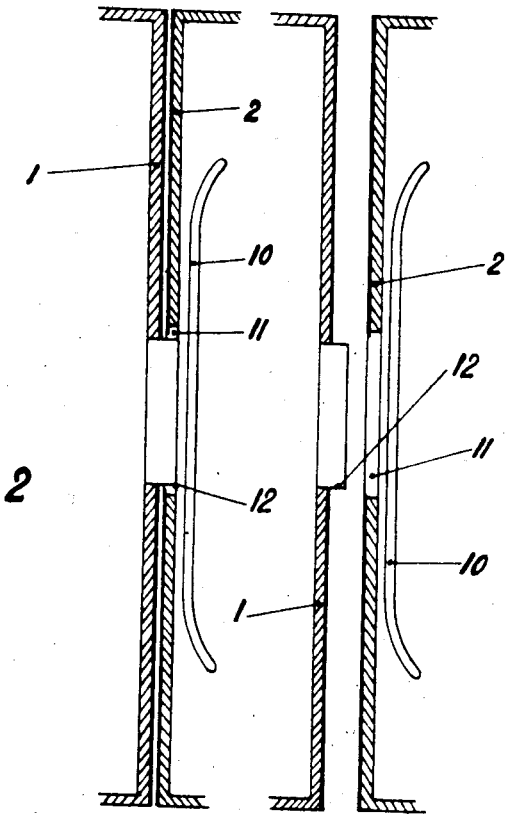

Patented Sept. 22, 1931

1,824,709

UNITED STATES PATENT OFFICE

ANDRÉ LÉON VICTOR CLÉMENT DEBRIE, OF PARIS, FRANCE

APPARATUS FOR TAKING PHOTOGRAPHIC OR CINEMATOGRAPHIC PICTURES

Application filed March 17, 1926, Serial No. 95,416, and in France April 20, 1925.

My invention has for its object an apparatus for taking photographic or cinematographic pictures allowing a very speedy and very easy loading in broad daylight.

In view of this, the apparatus comprises two parts, namely a front part containing the film driving device, the shutter and the optic arrangement and a rear removable part which can be secured instantaneously to the front part and which contains a feeding storing box wherein the unimpressed film is disposed together with the film guiding devices, the transmission gear and a second storing box into which the impressed film is wound up. Latter box can be the same as the feeding box or else both boxes can be made separate. The operator can thus be provided with several rear parts ready for use which he may secure to the front part of the apparatus according to the requirements. The result thereof is, besides the advantage already mentioned, a saving of time which is of great interest in the case where the taking of the complete scene which is to be cinematographed requires a length of film greater than what can be contained in one single storing box.

Special devices must be provided for ensuring, when the rear removable part of the apparatus is secured to the front part thereof, on one hand an accurate focussing of the objective with reference to the film and on the other hand an accurate setting of the film contained in the rear part with reference to the driving device contained in the front part.

In view of this the plate bearing the guides wherethrough the film is adapted to pass when it is being impressed is provided with an opening the size of which is slightly above that of one of the pictures and wherein the frame of the exposing window borne by the front part of the apparatus is adapted to engage, projecting at the same time slightly to the rear of the said guiding plate.

On the other hand the front wall of the rear part of the apparatus is provided with a movable catch which when it has been pushed back by a part projecting beyond the rear wall of the front part releases a projection which had engaged one of the perforations of the film. One of the teeth of the film driving drum borne by the front part can then engage this perforation which is thus set free and in front of which it is set, by reason of the arrangement of the apparatus, when the controlling crank of the apparatus is stopped in a predetermined position shown if required by a mark.

The system for securing the rear part to the front part can be of any suitable type.

A form of execution of my invention is shown by way of example on appended drawings whereof:

Figs. 2 and 2a are detail views showing how the openings or windows used for exposure are arranged.

Figs. 3 and 4 are plan views showing in two different positions the device adapted to ensure the accurate setting of the film.

Figure 1:
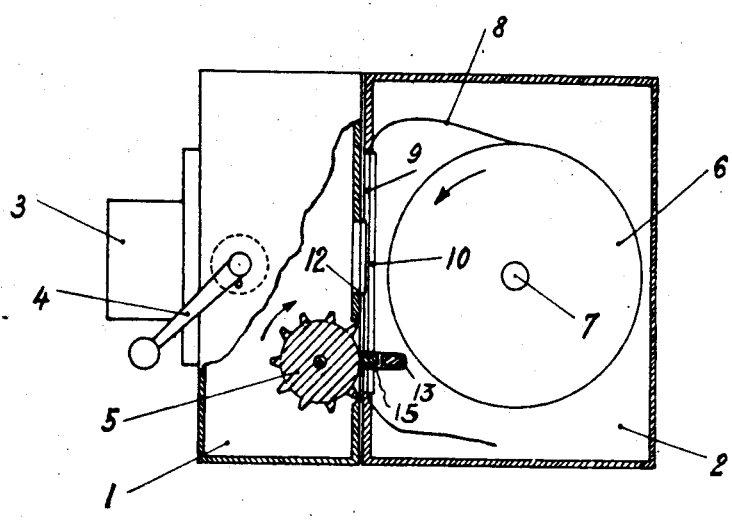
Fig. 1 is a front part view, partly sectional, of the apparatus.
Figure 1:
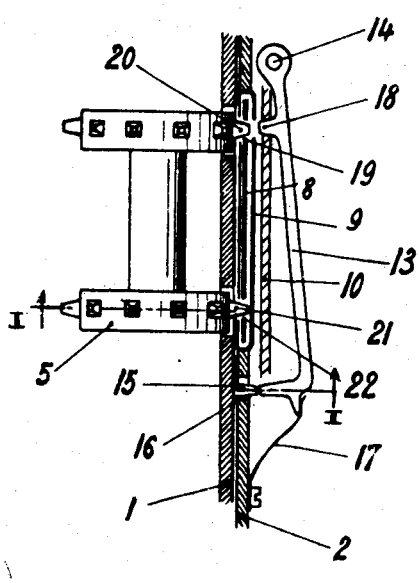
Figure 1:
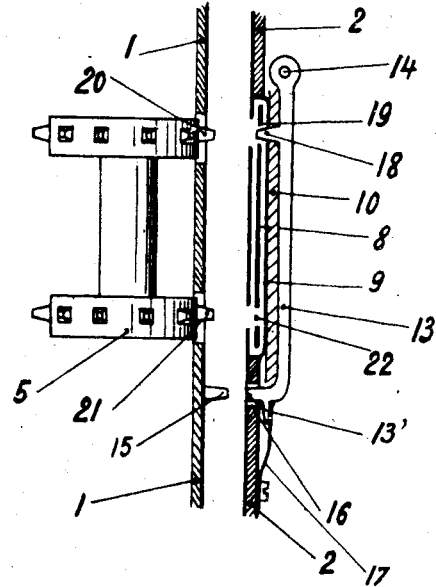

Finally Fig. 5 shows a form of execution of the system used for securing the rear part to the front part.

The view taking apparatus comprises two parts: a front part 1 and a rear part 2 secured together by any suitable speedy securing device.

The front part comprises the objective 3, the crank 4 and the film driving mechanism of which only the toothed drum 5 is shown. Besides the actuation of the film can be provided for by any suitable arrangement such as a maltese cross drum, a clutch or the like.

The rear part contains the feeding and receiving storing boxes which may be separate and disposed parallel to each other or on the contrary united as one double box. A form of execution with two distinct boxes is shown on Fig. 1 whereon one of the boxes may be seen at 6, the film being wound or unwound according to the case, round the horizontal shaft 7. The film 8 after passing out of the feeding storing box passes over one or more suitable transmitting rollers, engages a guiding plate or channel 9 provided in the front wall of the rear part 2 and passes back over one or more transmission rollers and is wound up inside the receiving storing box; the front wall of the part 2 is provided with holes arranged so as to allow the teeth of the toothed drum 5 which project beyond the rear wall of the part 1 to engage the perforations of the film 8.

A blade 10 disposed at the rear of the plate 9 presses against the film to a suitable degree, it is preferably made to move to and fro under the action of a controlling device disposed in the front part 1 of the apparatus whereby it is made to alternatingly move nearer to and further away from the film so that it is caused to press against it only whilst a picture is being taken and to release it when the film is to advance.

The guiding plate 9 shows an opening 11 which comes in front of the objective 3 when the rear part 2 is secured to the front part 1. This opening 11 (Figs. 2 and 2a) has a size somewhat larger than that of a picture and is provided with the frame 12 surrounding the window used for exposure. This frame borne by the front part 1 fits exactly in the opening 11 and projects slightly to the rear of the wall of the rear part 2 so as to provide for an accurate setting of the objective with reference to the film which is to be exposed. Fig. 2 shows the two parts of the apparatus when taken to pieces and Fig. 2a shows the same secured together.

A catch 13 pivoted at 14 is disposed near the front wall of the rear part 2 and ends with an incurved part 13' which passes through an aperture 16 provided in this wall but without projecting beyond the said wall. An elongated centering pin 15 is secured to the rear wall of the front part 1 so as to appear when the apparatus is being mounted just in front of the aperture 16.

A spring 17 bears against the end of the catch 13 so as to urge its end 13' into the aperture 16. In this position shown on Fig. 3 a projection 18 borne by the catch 13 engages a perforation 19 of the film 8.

When the rear part 2 of the apparatus is being mounted on the front part 1, the centering pin 15 borne by the latter comes against the incurved end 13' of the catch 13 and urges it back inside the part 2 whereby the catch 13 is made to pivot round its axis 14 (Fig. 4). During this movement the projection 18 releases the perforation 19 and a tooth 20 of the drum 5 which is disposed so as to be at this moment just in front of the said perforation, engages it whilst another tooth 21 of the opposite toothwork of the same drum enters at the same time the opposite perforation 22.

In order to make sure that whilst the apparatus is being mounted, two teeth of the drum are just in front of perforations of the film such as 19 and 22, the crank 4 should always be stopped in the same position which can for instance be shown by a mark. The several parts can thus be accurately put in place and the apparatus is ready for working under the best conditions: when a length of film is completely exposed, the rear part 2 can be very speedily removed and replaced by another which has been previously prepared and contains a double storing box or two single storing-boxes one of which contains an unimpressed film which may be, or not, wound round a spool.

Evidently the form of execution of the catch 13 which has just been described is given only by way of example and it could be replaced by any other device producing the same result.

The securing of the rear part of the apparatus to the front part can be provided for, for instance, by means of the device shown on Fig. 5.

To the rear wall of the front part 1 is slidably adjusted a bolt comprising two lateral blades 23 and 24 to which is pivotally secured at 25 and 26 an arm 27 pivoting round an axis 28. The blade 23 is provided with two notches 29 and 30 which continue into slots cooperating with pins 31 and 32 borne by the rear part 2. In a similar manner the blade 24 shows two notches 33, 34 the corresponding slots of which are directed downwards and cooperate with pins 35 and 36 borne by the rear part 2. The end of the blade 23 is provided with a controlling knob 37.

The working is as follows: When the two parts of the apparatus are to be connected it is sufficient to press down the knob 37: the blade 23 moves downwards and the pins 31 and 32 engage the top of the slots 29 and 30. This motion of the blade 23 makes the lever 27 pivot round 28 and thereby the blade 24 rises. This causes the pins 35 and 36 to engage the bottom of the slots 33 and 34; the two parts of the apparatus are thus bolted together, the final cooperating position of the pins 31, 32, 35 and 36 in their notches 29, 30, 33, 34 provides for the proper juxtaposition of the parts 1 and 2.

Evidently the above described apparatus can be used without removing the rear part 2 away from the front part 1 in which case it is sufficient to remove the storing boxes alone as in the usual apparatus.

What I claim is:

1. In a view taking apparatus, the combination of two independent parts adapted to be removably secured together one behind the other and to bear against each other exclusively along the cooperating front wall of the rear part and rear wall of the front part, cooperating exposure apertures being provided in said cooperating walls, an objective carried by the front part, a film and means for feeding same to the exposure aperture and for winding it after exposure carried by the rear part, a device contained in the rear part adapted to pass through a perforation of the film for holding the latter in a predetermined position with reference to the aperture in the front wall of the rear part, control means carried by the front part adapted to render said device inoperative when the two parts are brought into cooperation and film advancing means including a sprocket wheel disposed in the front part said sprocket wheel being spaced from the last mentioned control means by a distance such that when the abovementioned device is caused to release the film one of its teeth snaps immediately into a perforation of the film.

2. An apparatus for taking cinematographic and photographic views comprising a front part containing the objective and the film-advancing means including a drum, a rear part removably secured to the said front part and containing the storing boxes for the unexposed and the exposed parts of the film, cooperating exposure apertures being provided in the rear wall of the front part and the front wall of the rear part, a movable catch pivotally secured to the front wall of the rear part, behind the exposure aperture and provided with an incurved end, an aperture being provided in the front wall of the rear part in front of said incurved end, a projection borne by the movable catch yielding means urging simultaneously said incurved end into the aperture in front of it and the catch projection into engagement with a perforation in the film, a centering pin carried on the outside of the rear wall of the front part and adapted to push the end of the catch out of its aperture when the two parts are secured together, teeth raised on the drum of the film advancing means adapted to engage the perforations of the film and means for guiding the film over the exposure aperture.

3. In a device as claimed in claim 1, a frame surrounding the exposure aperture in the front part and adapted to fit into and to project beyond the exposure aperture in the front wall of the rear part to an extent such as will make it bear against the film passing behind lastmentioned aperture.

In testimony whereof I have signed my name to this specification.

ANDRÉ LÉON VICTOR CLÉMENT DEBRIE.